US005988859A

United States Patent [19]

Kirk

[11] Patent Number: 5,988,859

[45] Date of Patent: Nov. 23, 1999

[54] APPARATUS FOR DISPENSING VALUABLE BULK COMMODITIES AND METHOD THEREFOR

[76] Inventor: Lester C. Kirk, 902 W. Utopia Rd., Phoenix, Ariz. 85027

[21] Appl. No.: 08/902,690

[22] Filed: Jul. 30, 1997

[51] Int. Cl.[6] .............................. G06F 17/00; G06F 7/00; B67D 5/24; B67D 5/08

[52] U.S. Cl. .................................. 364/479.02; 364/479.1; 364/479.12; 222/52; 222/54; 222/30

[58] Field of Search ......................... 364/479.02, 479.07, 364/479.1, 479.11, 479.12, 479.14, 479.01, 479.06; 222/52, 54, 55, 30, 61, 144.5, 399

[56] References Cited

U.S. PATENT DOCUMENTS

| | | | |
|---|---|---|---|
| 4,979,639 | 12/1990 | Hoover et al. | 364/479.1 |
| 4,979,641 | 12/1990 | Turner | 364/479.1 |
| 5,007,560 | 4/1991 | Sassak | 222/58 |
| 5,022,557 | 6/1991 | Turner | 222/54 |
| 5,109,347 | 4/1992 | Quick, Jr. et al. | 364/479.1 |
| 5,303,845 | 4/1994 | Osawa | 222/1 |
| 5,431,302 | 7/1995 | Tulley et al. | 222/52 |
| 5,601,218 | 2/1997 | Takenaka | 222/641 |
| 5,659,482 | 8/1997 | Warn et al. | 364/479.1 |
| 5,731,981 | 3/1998 | Simard | 364/479.1 |
| 5,871,121 | 2/1999 | Hashimoto et al. | 222/54 |

*Primary Examiner*—William E. Terrell
*Assistant Examiner*—Wonki K. Park
*Attorney, Agent, or Firm*—Jordan M. Meschkow, Esq.; Lowell W. Gresham, Esq.; Meschkow & Gresham, P.L.C.

[57] ABSTRACT

A system (10) controls the dispensing of valuable commodities, such as beers. The system (10) includes a controller (36), sensors (26, 34), and solenoid-activated valves (24). The dispensing of a commodity begins when an operator identifies himself or herself to the controller (36) after selecting a commodity and quantity. A record of this transaction is recorded in a memory (40) of the controller (36). The controller (36) continues dispensing the selected commodity, determines when the selected quantity has been dispensed, then automatically ceases dispensing the commodity. Reports (178) are generated summarizing dispensing transactions. A variety of operational parameters may be established by a manager. Parameters relevant to the preservation and flow of the commodity, such as temperature and pressure, are monitored, and warnings annunciated (164, 170) if out-of-range conditions are detected.

22 Claims, 6 Drawing Sheets

178

TIME OF REPORT: 00/00/00 00:00AM
LOGGED IN : 00:00AM LAST POURED: 00:00AM
TEMP. DAILY

| BEER/W NAME | DAY | W/E TH | MON TH | YTD MAY | SALES TOTAL | % |
|---|---|---|---|---|---|---|
| BREW | G | 1.00 | 2 | 11 | 11 | 12.6 |
| BREW | S | 0.00 | 1 | 5 | 5 | 5.8 |
| BREW | L | 0.00 | 0 | 0 | 0 | 0.0 |
| BEER2 | G | 1.00 | 2 | 8 | 8 | 8.8 |
| BEER2 | S | 0.00 | 1 | 6 | 6 | 6.6 |
| BEER2 | L | 0.00 | 2 | 8 | 8 | 8.8 |
| BEER3 | G | 1.00 | 2 | 10 | 10 | 11.0 |
| BEER3 | S | 0.00 | 0 | 4 | 4 | 4.4 |
| BEER3 | L | 2.00 | 8 | 12 | 12 | 13.2 |
| BEER4 | G | 0.00 | 1 | 9 | 9 | 9.9 |
| BEER4 | S | 0.00 | 0 | 0 | 0 | 0.0 |
| BEER4 | L | 3.50 | 10 | 17 | 17 | 19.2 |
| TOTALS | | 8.50 | 30 | 91 | 91 | 100 % |

MANAGER: 00 TIMES ***** TO *****
CLEANING: 02 TIMES 10:33AM TO 10:34AM

NON-RESETTABLE GRAND TOTAL $ 439
Z 0032
V3-09/Y01

180

| DISPENSING DURATION | | | | H | | | S | | | P | | | | | | |
|---|---|---|---|---|---|---|---|---|---|---|---|---|---|---|---|---|
| BRAND | GLASS | SM PIT | LG PIT | G | SM PIT | LG PIT | G | SM PIT | LG PIT | G | SM PIT | LG PIT | LOW TEMP | HIGH TEMP | LOW PRESS | HIGH PRESS |
| BEER1 | 3 | 12 | 24 | - | - | - | - | - | - | - | - | - | 34 | 41 | 14 | 20 |
| BEER2 | 5 | 15 | 30 | - | - | - | - | - | - | - | - | - | 33 | 37 | 15 | 21 |
| BEER3 | 5 | 15 | 30 | - | - | - | - | - | - | - | - | - | 33 | 37 | 14 | 19 |
| BEER4 | 5 | 15 | 30 | - | - | - | - | - | - | - | - | - | 33 | 37 | 14 | 19 |
| BEER5 | 5 | 15 | 30 | - | - | - | - | - | - | - | - | - | 33 | 37 | 14 | 19 |
| BEER6 | 7 | 18 | 36 | - | - | - | - | - | - | - | - | - | 29 | 34 | 12 | 18 |
| BEER7 | 4 | 14 | 28 | - | - | - | - | - | - | - | - | - | 33 | 37 | 14 | 19 |
| BEER8 | 5 | 15 | 30 | - | - | - | - | - | - | - | - | - | 33 | 37 | 14 | 19 |

82

*Fig. 6*

82

| HOUR | OPEN/ CLOSED | H / S / P |
|---|---|---|
| 0 | O | S |
| 1 | C | S |
| 2 | C | S |
| 3 | C | S |
| 4 | C | S |
| 5 | C | S |
| 6 | C | S |
| 7 | C | S |
| 8 | C | S |
| 9 | C | S |
| 10 | C | S |
| 11 | C | S |
| 12 | O | S |
| 13 | O | S |
| 14 | O | S |
| 15 | O | S |
| 16 | O | S |
| 17 | O | H |
| 18 | O | S |
| 19 | O | S |
| 20 | O | S |
| 21 | O | S |
| 22 | O | S |
| 23 | O | S |

*Fig. 7*

APPARATUS FOR DISPENSING VALUABLE BULK COMMODITIES AND METHOD THEREFOR

TECHNICAL FIELD OF THE INVENTION

The present invention relates generally to devices which control the dispensing of valuable bulk commodities, such as beers, to maintain accountability over the commodities.

BACKGROUND OF THE INVENTION

Commodities are often stored in bulk by merchants and sold off a little at a time in a variety of different transactions. With conventional dispensing devices, in some of the transactions a little more of a commodity may be dispensed and in other transactions a little less of the commodity may be dispensed. In some cases, commodities may be dispensed without collecting money. Accordingly, dispensing of commodities often leads to losses. Moreover, these losses become more significant as the commodity being dispensed becomes more valuable.

Beer represents one such valuable commodity. Beer is often stored in kegs by a bar owner and sold by the glass or pitcher to bar customers. Due the effervescent, perishable nature of beer and the nature of bar operations, dispensing beer from a tap into a container too often results in beer losses.

For example, beer is a perishable commodity that needs to be kept within a temperature range to maintain its quality. Failure to maintain proper temperature may lead to losses. Beer often foams to form a head as it hits a glass or pitcher. A bartender may then let the tap run to overfill the container but otherwise get a desired combination of beer and head. Overfilling containers represents another source of beer losses. The tendency of beer to foam using conventional beer dispensing devices may be controlled by careful attention to details, such as properly positioning a container to receive beer from a tap and maintaining proper beer pressure. Unfortunately, bars are often busy places and bartenders may get distracted while dispensing beer. Moreover, bartenders and owners are typically unaware of beer pressure so long as the pressure is not extremely high or extremely low. Accordingly, undesirably foamy beer leads to other beer losses. In addition, bar owners often employ bartenders. A few bartenders may be tempted to give away beer to friends or otherwise pilfer beer, leading to further beer losses. Conventional beer dispensing devices fail to institute controls which tend to ameliorate such beer losses.

In addition, bar owners face legal requirements in many locations concerning hours during which beer may and may not be dispensed. Failure to comply with such regulations subjects the bar owner to the risk of being assessed with a penalty. Unfortunately, conventional beer dispensing devices do not allow a bar owner to maintain sufficiently tight control over the dispensing of beer to ensure compliance with such regulations. For example, bar owners or managers may not always be present to supervise bar operations, and bartenders may dispense beer after hours in spite of explicit instructions not to do so. In other situations, bartenders may accidentally dispense beer after hours because they are not aware of the time.

SUMMARY OF THE INVENTION

Accordingly, it is an advantage of the present invention that an improved apparatus and method for dispensing valuable bulk commodities are provided.

Another advantage of the present invention is that an apparatus and method which provide accountability in the dispensing of bulk commodities are provided.

Another advantage is that an apparatus and method which provide accountability controls yet permit flexibility in dispensing valuable bulk commodities are provided.

Another advantage is that an apparatus and method which are suitable for controlling the dispensing of beer are provided.

Another advantage is that an apparatus and method are provided which help a bar owner ameliorate beer losses.

The above and other advantages of the present invention are carried out in one form by an apparatus for controlling the dispensing of valuable bulk commodities to maintain accountability over the commodities. The apparatus includes a commodity identity selector for routing one of a plurality of commodities to a dispensing port. A commodity quantity selector controls the amount of the one commodity which is routed to the dispensing port. A dispensing attendant selector identifies a person responsible for causing the amount of the one commodity to be routed to the dispensing port. A recorder couples to the commodity identity selector, the commodity quantity selector, and the dispensing attendant selector. The recorder records the selected one commodity, the amount, and the responsible person identity in association with one another.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a block diagram of a first exemplary memory structure which stores parameters used in operating the controller;

FIG. 7 shows a block diagram of a second exemplary memory structure which stores parameters used in operating the controller;

DETAILED DESCRIPTION OF THE PREFERRED EMBODIMENTS

Figure 1:
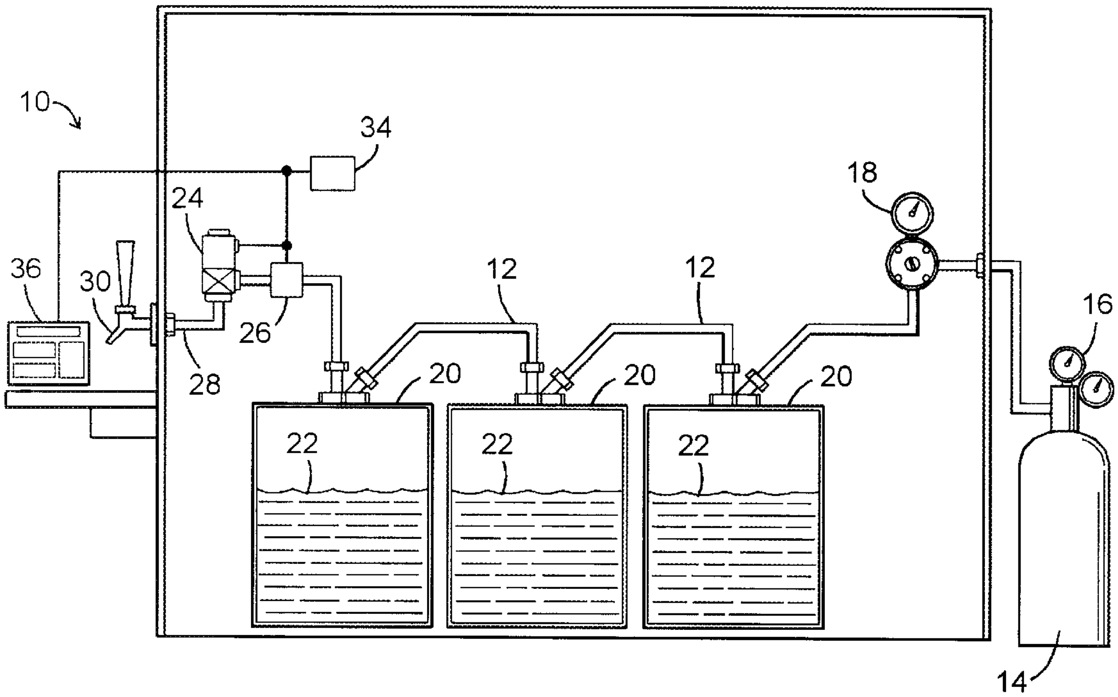
FIG. 1 shows a layout diagram for a system which controls the dispensing of a bulk commodity, such as beer.

FIG. 1 shows a layout diagram for a system 10 which controls the dispensing of bulk commodities to maintain accountability over the commodities. In the preferred embodiment, system 10 is specifically adapted to controlling the dispensing of liquid bulk commodities, and more specifically to the dispensing of beer. In controlling the dispensing of beer, system 10 may, for example, be used in a commercial bar. However, those skilled in the art will appreciate that system 10 is not limited to dispensing beer and may be used in a wide variety of applications where valuable bulk commodities are dispensed in accordance with a multiplicity of transactions.

FIG. 1 illustrates a single beer circuit 12. Circuit 12 includes a pressurized $CO_2$ source 14 having an outlet at a primary regulator 16. Primary regulator 16 desirably maintains a pressure in the range of 35–40 lbs. in a tube which couples primary regulator 16 to a secondary regulator 18. Secondary regulator 18 desirably maintains a pressure in the range of 16–18 lbs. in the portion of circuit 12 residing downstream of secondary regulator 18. Any number of kegs 20 are connected in series to the low pressure side of secondary regulator 18. Kegs 20 store a bulk commodity, such as beer 22. Downstream of kegs 20, beer circuit 12 includes a solenoid operated valve 24. In addition, a pressure sensor 26 couples to beer circuit 12 between valve 24 and the low pressure side of regulator 18. Kegs 20, pressure sensor 26, and secondary regulator 18 all reside on an upstream side of valve 24.

On the downstream side of valve 24, a hose or tube 28 connects valve 24 to a dispensing port or tap 30. Tube 28 is desirably 3⁄16 in. hose at least 48 in. long. This length of hose is desirable in a beer dispensing application because it helps smooth out beer flow to reduce the likelihood of unusually high amounts of foam.

Kegs 22 desirably reside in a walk-in cooler or box 32. A desirable temperature for storing beer is in the 29–41° F. range, and usually in the 32–34° F. range. If beer experiences temperatures outside this range for any substantial length of time, quality deteriorates, and the entire lot may be wasted. At least one temperature sensor 34 is positioned within cooler 32 to sense the temperature of at least one of the beers 22 located in cooler 32.

Valve 24, pressure sensor 26, and temperature sensor 34 all electrically couple to a controller 36. In the preferred embodiments, controller 36 resides proximate tap 30 so that its control panel (discussed below) is easily operated by a bartender or other attendant responsible for dispensing beer (not shown). Pressure sensor 26 and temperature sensor 34 generate electrical signals which are communicated to controller 36 and processed in a manner which is discussed below. Controller 36 generates electrical signals which control the operation of valve 24. Controller 36 can open valve 24 to promote flow of beer through tap 30 and close valve 24 to impede the flow of beer through tap 30. Tap 30 may itself be a manually-operated valve in beer circuit 12. During normal operation, tap 30 is left in an open position so that the flow of beer is controlled by valve 24.

FIG. 1 illustrates only a single beer circuit 12. However, system 10 desirably controls a plurality of beer circuits 12. Additional circuits exist substantially independently of and in parallel with the single beer circuit 12 illustrated in FIG. 1. Desirably, taps 30 for all circuits 12 are located proximate one another for the convenience of a bartender.

Figure 2:
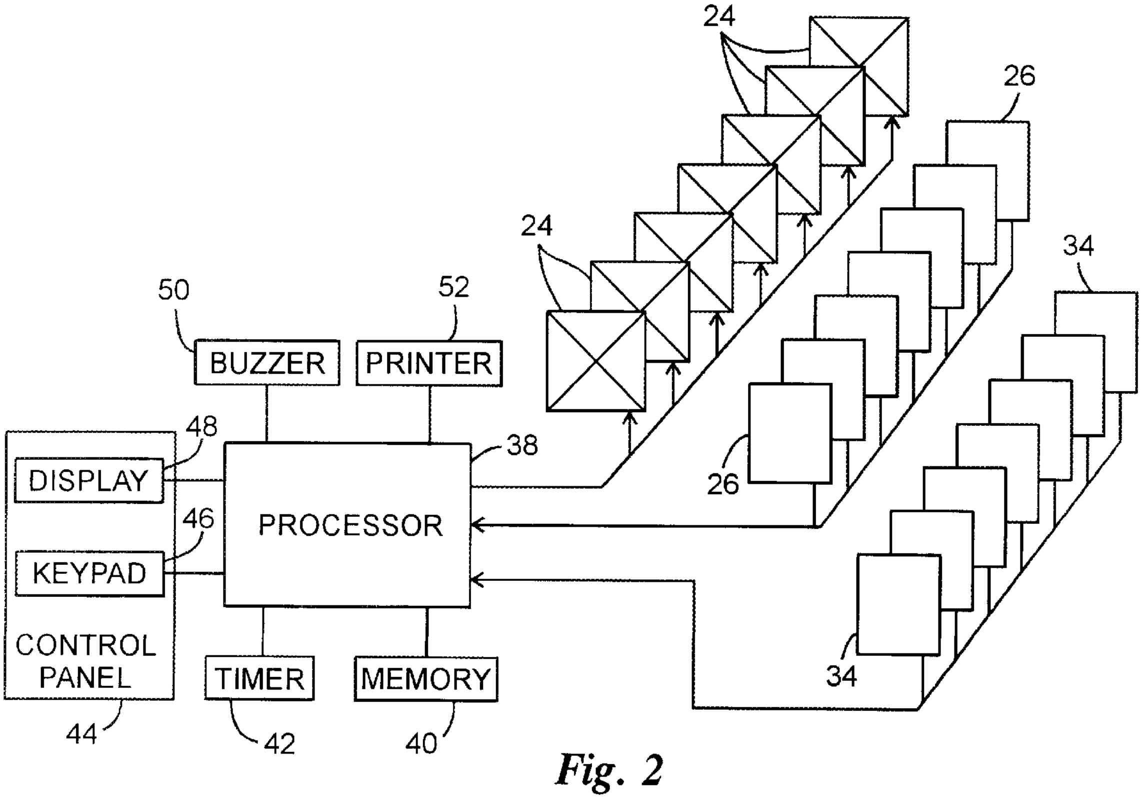
FIG. 2 shows a block diagram of the system.

FIG. 2 shows an electrical block diagram of system 10. Controller 36 includes a processor 38, which may be embodied in any convenient microprocessor circuit. Processor 38 couples to a memory 40, a timer 42, a control panel 44 which includes a keypad 46 and a display 48, a buzzer 50, and a printer 52. Memory 40, timer 42, control panel 44, buzzer 50, and printer 52 are all included in controller 36. In addition, processor 38 couples to a plurality of valves 24, where each valve 24 is positioned in a beer circuit 12 as discussed above in connection with FIG. 1. In the preferred embodiment, a plurality of pressure sensors 26 and a plurality of temperature sensors 34 are associated with a plurality of individual beer circuits 12 as discussed above in connection with FIG. 1 and are electrically coupled to processor 38 within controller 36.

Memory 40 is used to store programming instructions which define processes performed by controller 36. Such processes are discussed below in connection with FIGS. 4–5 and 8. In addition, memory 40 stores variables, lists, tables, data bases and other memory structures which are used in connection with the programming instructions to operate system 10. Exemplary versions of two such memory structures are illustrated below in connection with FIG. 6–7. Further, memory 40 serves as a recorder for recording data which account for dispensed bulk commodities. For example, when the bulk commodity (i.e. beer) is dispensed, memory 40 records the brand or other identity of commodity dispensed, the quantity dispensed, and the attendant responsible for dispensing the bulk commodity in association with one another.

Timer 42 helps controller 36 keep track of time. As discussed in more detail below, various controller functions are conditioned upon the time of day and day of the week. Control panel 44 is further illustrated in FIG. 3. Desirably, control panel 44 is suitably configured for operation in a bar. For example, various switches in keypad 46 are desirably positioned under a sealed overlay. Functions performed by controller 36 in response to the action of various keys in keypad 46 are discussed below. Display 48 may, for example, be a conventional LCD display of suitable size so that several different items of information may be displayed thereon simultaneously.

Figures 3, 9:
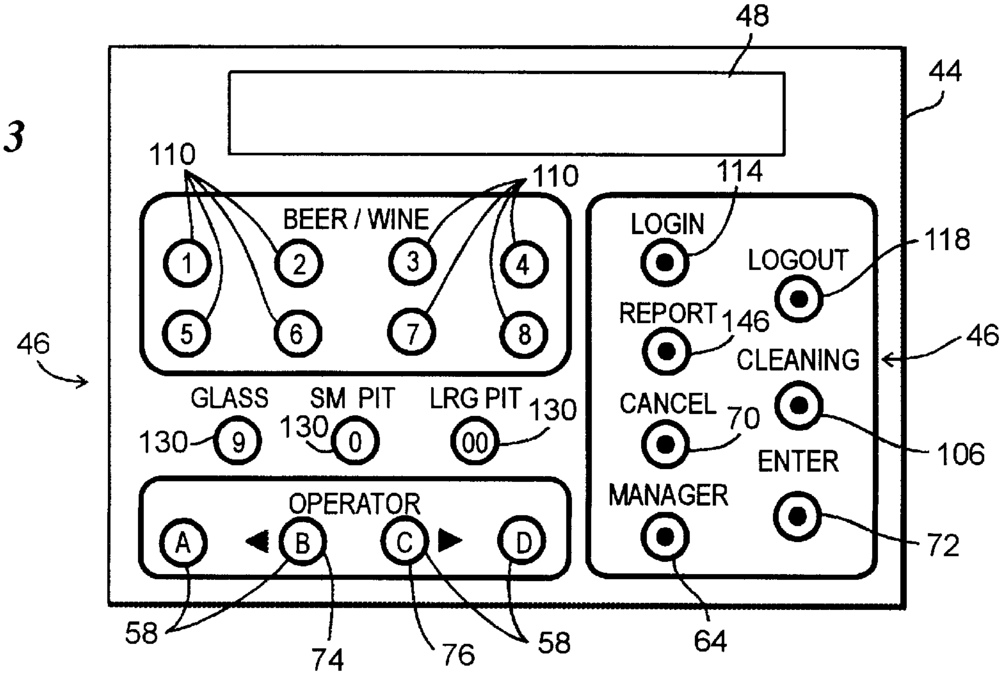
FIG. 3 shows a control panel portion of a controller used by the system.
FIG. 9 shows an exemplary report generated by a report generator portion of the controller.

Buzzer 50 produces an audible "beep" or other sound when activated to do so by processor 38. Buzzer 50 and/or display 48 may be used to annunciate warnings to operators of system 10. Printer 52 serves as a report generator for system 10. One exemplary report which may be generated by the operation of system 10 is illustrated in FIG. 9.

Figure 4:
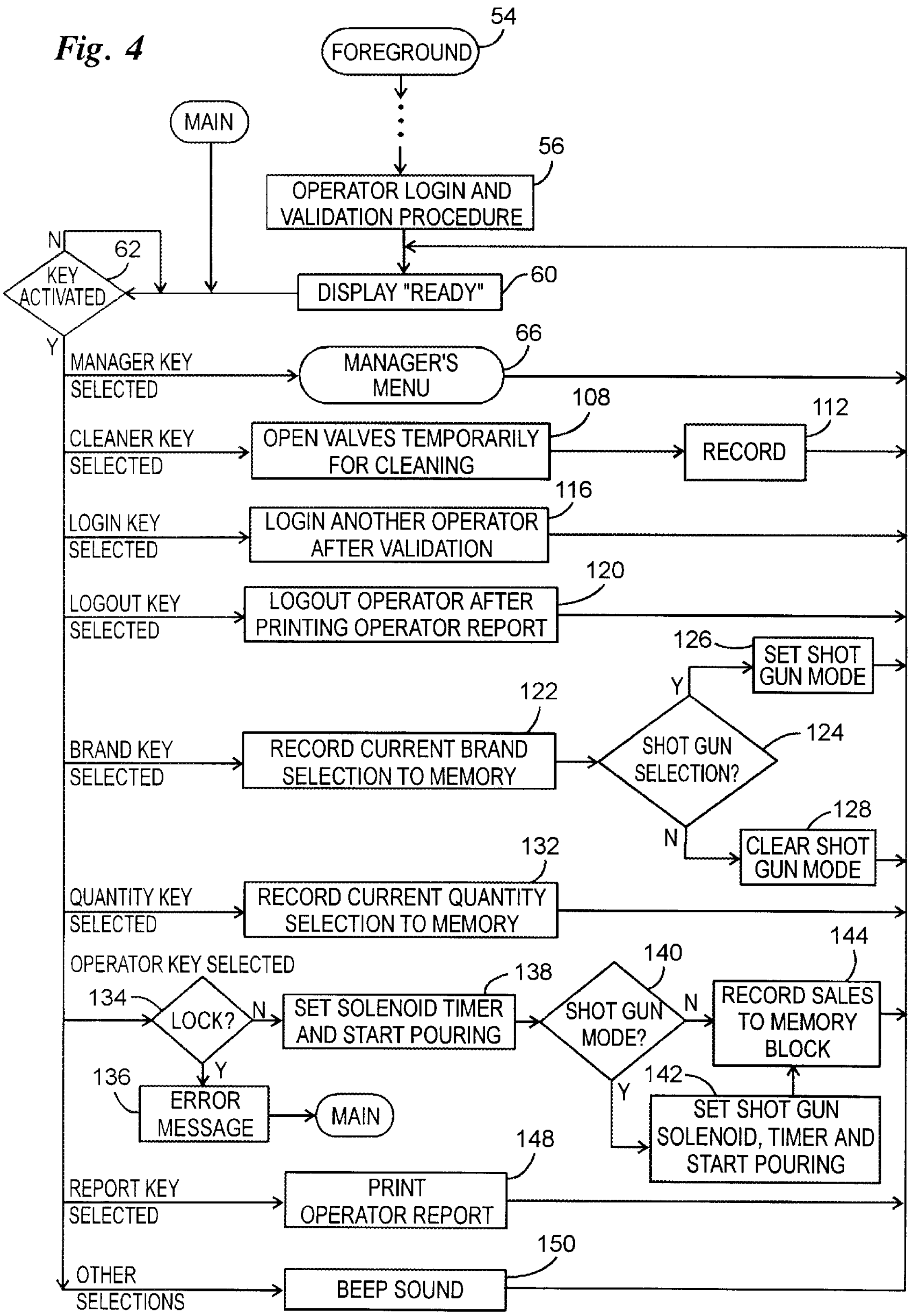
FIG. 4 shows a flow chart of a foreground process performed by the controller.

FIG. 4 shows a flow chart of a foreground process 54 performed by controller 36 (see FIGS. 1–2). Generally, foreground process 54 causes system 10 to respond to user input presented at keypad 46 (see FIGS. 2–3). Accordingly, process 54 is discussed below with reference to FIGS. 3–4. Process 54 begins when controller 36 is first energized or otherwise reset. Process 54 may include any number of tasks which are not related to the present invention, as indicated by ellipsis in FIG. 4. Such tasks may include initialization, displaying a logo in display 48, and other tasks conventional in the art of microprocessor-based controllers.

Eventually, process 54 performs a task 56 to implement an operator login and validation procedure. During operator login, a bartender or other attendant enters a four digit personal identification number (PIN) assigned to the operator by a manager. Assuming an entered PIN is recognized, task 56 then assigns an operator reference, such as one of the alphabetic characters A–D, and the operator confirms the assignment by pressing the like-labeled key in keypad 46. Operator identity keys are included in a dispensing attendant key section 58 of keypad 46.

Following task 56, a task 60 displays a "READY" message at display 48, and program flow proceeds to a main idle loop. In the main idle loop, process 54 performs a query task 62 to determine whether a key from keypad 46 has been activated. If no key activation is detected, program control remains at the main idle loop. However, when a key activation is detected, program control proceeds to a programming thread determined in response to the specific key activation detected at task 62.

Figure 5:
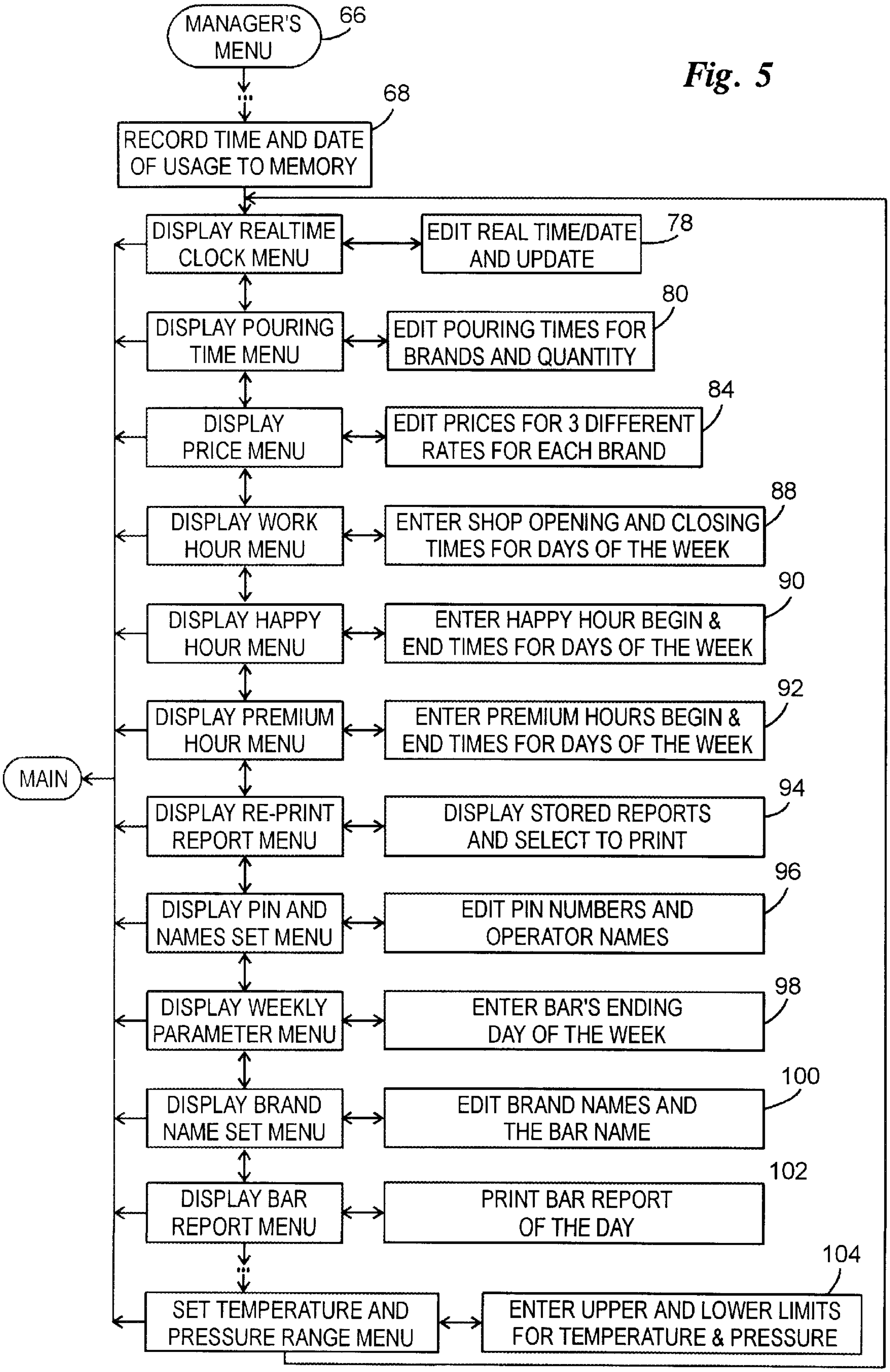
FIG. 5 shows a flow chart of a manager's menu process performed by the controller.

When task 62 detects activation of a manager key 64, program flow proceeds to a manager's menu process 66. A flow chart showing manager's menu process 66 is shown in FIG. 5. Generally, manager's menu process 66 allows a manager to enter and change operating parameters. Referring, to FIGS. 3 and 5, manager's menu process 66 may include tasks which are not important to the present invention, as indicated by ellipsis in FIG. 5. Such tasks may include a prompt which requests the manager to enter a manager PIN and which verifies that any entered PIN matches a recorded manager PIN.

Eventually, process 66 performs a task 68. During task 68, process 66 records in memory 40 the time and date manager's process 66 is used. This record provides an account of manager manipulations of operating parameters. After task 68, process 66 implements a sequential menu structure having any number of different stages. At each stage in the menu structure, a manager may cause program flow to exit manager's menu process 66 by pressing a cancel key 70, enter or edit operating parameters related to the current stage by pressing an enter key 72, proceed to the previous stage by pressing a "<" key 74, or proceed to the next stage by pressing a ">" key 76. As illustrated in FIG. 3, the "<" and ">" keys 74 and 76 may be the same keys used for other functions, such as identifying operators "B" and "C", respectively.

At a first stage 78, a manager may edit the current date and time. In a stage 80, the manager may edit dispensing durations for various commodities and various quantities. In the beer dispensing application of the preferred embodiment, various commodities represent various beer circuits 12 (see FIG. 1). For the sake of clarity, such diverse commodities are referred to as brands below. In a typical installation, different beer circuits 12 may, but are not required, to route different brands of beer to respective taps 30.

FIG. 6 shows a block diagram of an exemplary memory structure 82 which controller 36 may implement in memory 40 to store some of the operating parameters. For convenience, FIG. 6 illustrates a two dimensional array with various brands listed along one dimension and various operating parameters listed along the other dimension. Memory structure 82 defines a dispensing duration, or pouring time, for each combination of a brand with a quantity. In the preferred embodiment, three different quantities may be dispensed in any transaction. These quantities are associated with glasses, small pitchers (SM PIT), and large pitchers (LRG PIT). Accordingly, for an example of eight different brands each of which may be dispensed in three different quantities, twenty-four different pouring times may be defined. Of course, not all pouring time operating parameters need to have different values. As an example, pouring times for all glasses may be roughly around 5 sec., for all small pitchers roughly around 15 sec., and for all large pitchers roughly around 30 sec. Due to these pouring time operating parameters stored in memory 40, when a brand is selected to be dispensed, the duration for which dispensing will continue is defined in response to the selected brand and a selected quantity.

Referring to FIGS. 3, 5, and 6, a stage 84 allows the manager to edit the prices to be charged for each brand. More particularly, stage 84 allows three different rates to be charged for each brand. These three different rates may correspond to a happy hour rate (H), a standard rate (S) and a premium rate (P). Due to these charge rate operating parameters stored in memory 40, when a brand is selected to be dispensed, a price is calculated based upon the brand selected, a quantity selected, and the one of the three different rates in effect for the current time of day.

FIG. 7 shows a block diagram of an exemplary memory structure 86 which controller 36 may implement in memory 40 to store other ones of the operating parameters. For convenience, FIG. 7 illustrates a three dimensional array with finely graduated time periods, such as hours of the day, listed along one dimension, coarsely graduated time periods, such as days of the week, listed along a second dimension, and various operating parameters listed along the third dimension. Referring to FIGS. 3, 5, and 7, a stage 88 permits a manager to add or edit operating parameters that define the opening and closing times for the various days of the week. These opening and closing times establish predetermined daily durations during which the bar will be closed. As discussed in more detail below, when the bar is closed, as defined by these operating parameters, system 10 prevents the dispensing of commodities.

Following stage 88, a stage 90 permits the manager to add or edit happy hour durations for the days of the week. During happy hour durations, prices will be calculated using the happy hour rates discussed above in connection with stage 84. The happy hour durations may be stored in memory structure 86. Next, a stage 92 allows the manager to add or edit premium hour durations for the days of the week. During the premium durations prices will be calculated using the premium rates discussed above in connection with stage 84. The premium hour durations may also be stored in memory structure 86.

Following stage 92, a stage 94 displays stored reports and permits the manager to select desired reports for printing at printer 52 (see FIG. 2). The reports are stored in memory 40 (see FIG. 2). Reports may include bar operation summary for the week, summary of operations by operator or attendant, previous week summary reports, and the like. Next, a stage 96 lets the manager edit PINs and associate PINs with operator names. In stage 96, the manager assigns PINs that will be used by the manager and by bartenders.

After stage 96, a stage 98 allows the manager to enter or edit the day of the week that the manager wishes to use as the ending day of the week. Reports which summarize bar operations on a weekly basis use the defined ending day of the week to determine where one week ends and another starts. In addition, at the end of the week controller 26 prints summary reports for the previous week. Next, a stage 100 allows the manager to associate names with the commodities dispensed through the use of system 10. For example, the manager may decide that a first beer circuit 12 (see FIG. 1) dispenses a first brand of beer, a second beer circuit 12 dispenses a second brand of beer, and so on.

Following stage 100, a stage 102 allows a manager to print a report summarizing bar operations for the current day. As indicated in FIG. 5 by ellipsis following stage 102, process 66 may include additional stages not relevant to the present invention. For example, additional stages may let a manager enter secret codes which enable a dead man's switch feature. If implemented, the dead man's switch feature allows system 10 to remain operational for an upcoming period of time, such as a month. Secret codes which will be accepted by the dead man's switch feature may be provided to a purchaser or renter of system 10 contingent upon the purchaser or renter making monthly payments.

Eventually, process 66 enters a stage 104. At stage 104, the manager may set or edit temperature and pressure ranges. In the preferred embodiment, the temperature and pressure ranges may be established for each brand, and stored in memory structure 82 (see FIG. 6). As discussed in more detail below, warnings are annunciated if beer pressure or temperature is outside of these established ranges. Typical low temperatures are in the 29–34° F. range and typical high temperatures are in the 34–41° F. range. Typical low pressures are in the 12–15 lb. range, and typical high pressures are in the 18–21 lb. range. If the manager causes process 66 to proceed to the next stage from stage 104, program flow may pass back to stage 78.

When the manager causes program flow to exit process 66, program flow passes back through task 60 (see FIG. 4) to the main idle loop at task 62 of foreground process 54. Referring to FIGS. 3 and 4, when task 62 detects the activation of a cleaning key 106, process 54 performs a task 108. Task 108 temporarily opens valves 24 (see FIGS. 1–2) for cleaning. Task 108 desirably prompts the operator to enter a PIN before proceeding and to select one or more brands whose valves 24 are to be opened for cleaning. Brands may be selected through the activation of commodity identity selector keys 110. Any operator or manager that can enter a valid PIN may open valves 24 for cleaning.

After task 108, a task 112 records in memory 40 the identity of the person opening valves 24. Other parameters such as brands opened and a date stamp may be recorded as well. The identity is determined by the PIN entered above in task 108. The identity and other data are recorded in association with data that describe the opening of valves 24 for cleaning. Accordingly, system 10 permits flexibility in bar operations. Any person having a valid PIN may cause valves 24 to open. Yet, system 10 provides accountability because a record is made of the valve openings and of the identities of the persons responsible. A bar manager may review this record to determine whether the number of valve openings and persons responsible appear to be in order. After task 108, program flow proceeds through task 60 to task 62.

When task 62 detects the activation of a login key 114, process 54 performs a task 116. Task 116 allows another operator to login, assuming that the operator can produce a valid PIN. Task 116 is similar to task 56, discussed above. Through the operation of task 116, the operator will be assigned an operator reference, such as one of the alphabetic characters A–D, and the operator confirms the assignment by pressing the like-labeled dispensing attendant key 58. In the preferred embodiment, up to four operators may be logged in at one time. After task 116, program flow proceeds back through task 60 to task 62.

When task 62 detects the activation of a logout key 118, process 54 performs a task 120. Logout task 120 prompts the operator to press the appropriate one of dispensing attendant keys 58 to signify which operator is logging out. When the dispensing attendant key 58 is pressed, a summary report concerning transactions associated with the operator is printed at printer 52 (see FIG. 2), and the operator is logged out. No further transactions will be associated with the operator until after the operator again logs in. Following task 120, program flow proceeds back through task 60 to task 62.

When task 62 detects the activation of a commodity identity selection key 110, process 54 performs a task 122. Task 122 records the selected brand in a variable in memory 40. Following task 122, a query task 124 determines whether controller 36 should operate in a "shot gun" mode. In the shot gun mode, two commodities may be dispensed concurrently into a common container. The shot gun mode is desirable when the two commodities may be mixed together because it reduces the time required to fill the container. For example, if two adjacent taps 30 (see FIG. 1) dispense the same brand of beer or different brands that a customer may want mixed together, then a small or large pitcher may be placed under both taps, and both taps may dispense beer into the pitcher.

In the preferred embodiment, if a quantity selection variable in memory 40 indicates a small or large pitcher selection, and if the brand selection recorded above in task 122 is a second of two brands selected, then the shot gun mode of operation is assumed. In this case a task 126 sets a flag signifying that the shot gun mode is in effect. Task 124 may conclude that the shot gun mode is not selected when the quantity selection variable indicates a glass selection or when task 122 has recorded only a first brand selection. In this case, a task 128 clears the shot gun flag. After either of tasks 126 or 128, program flow proceeds through task 60 back to task 62.

When task 62 detects the activation of a commodity quantity selection key 130, process 54 performs a task 132. Task 132 records the current quantity selection in memory 40. As discussed above, the preferred embodiment permits selection of any one of three different quantities. The three different quantities correspond to a glass, a small pitcher, and a large pitcher. After task 132, program flow proceeds through task 60 back to task 62.

When task 62 detects the activation of a dispensing attendant, or operator, key 58, process 54 performs a query task 134. Task 134 determines whether the dispensing of commodities is locked or otherwise prohibited. Task 134 may evaluate memory structure 86 (see FIG. 7) and the current date/time to determine whether the current time is after closing hours and before opening time. If after closing hours, controller 36 prevents the routing of commodities to dispensing taps 30, and a task 136 causes an error message to be displayed at display 48. Following task 136, program flow proceeds to the main idle loop at task 62.

When task 134 determines that the dispensing of commodities is not locked, a task 138 sets a solenoid timer and opens a solenoid-activated valve 24 (see FIGS. 1–2). The valve 24 opened by task 138 corresponds to the brand selection last recorded in memory 40 by task 122. The solenoid timer set in task 138 acts as an alarm clock. Task 138 determines the time for which the solenoid timer is set by evaluating memory structure 82 (see FIG. 6). The dispensing duration recorded in memory structure 82 for the selected brand and quantity is the time for which the solenoid timer is set. At this point, the dispensing of a selected commodity has been initiated.

After task 138, a query task 140 determines whether controller 36 is operating in its shot gun mode. Task 140 may evaluate the shot gun flag set or reset above in tasks 126 or 128 in making its determination. If the shot gun mode is in effect, then a task 142 appropriately adjusts the amounts selected for the selected commodities and activates a second solenoid-activated valve 24. The second valve 24 corresponds to the second selected brand. The selected amounts are adjusted by decreasing the dispensing duration defined for the alarm clock timer. For example, the dispensing duration selected above in task 138 may be decreased by ½ when operating in the shot gun mode. Thus, twice the commodity is dispensed while valves 24 remain open because two beer circuits 12 are used to dispense beer. However, valves 24 remain open only ½ of the duration they would have remained open if not operating in the shot gun mode.

After task 142 and when task 140 determines that controller 36 is not operating in its shot gun mode, a task 144 records the transaction to memory 40. Task 144 desirably records the brand, quantity, and responsible operator in association with each other. If operating in the shot gun mode, task 144 may record two transactions, with each brand being assessed ½ of the total dispensed quantity. By recording these data items in association with each other, accountability over the dispensing of the commodity is maintained. Operators and managers may review summary reports to determine whether all appears to be in order. After task 144, program flow proceeds through task 60 back to the main idle loop at task 62.

When task 62 detects the activation of a report key 146, process 54 performs a task 148. Task 148 prints a summary report for a specified operator at printer 52 (see FIG. 2). After task 148, program flow proceeds through task 60 back to the main idle loop at task 62. As indicated at a task 150, if task 62 detects the activation of keys for which no function is defined at task 62, then controller 36 emits a beep sound using buzzer 50. Following task 150, program flow proceeds through task 60 to the main idle loop at task 62.

Figure 8:
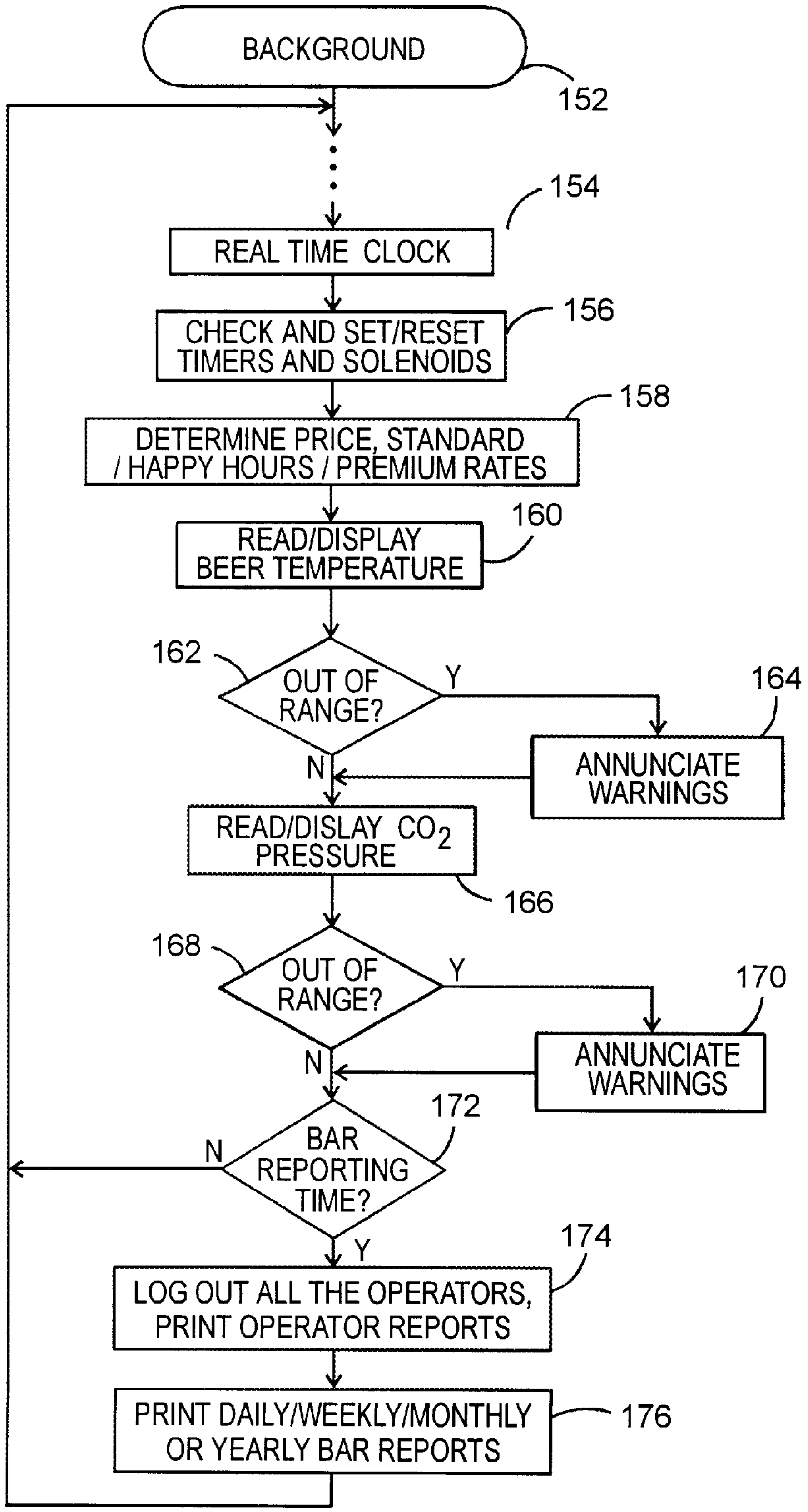
FIG. 8 shows a flow chart of a background process performed by the controller.

FIG. 8 shows a flow chart of a background process 152 performed by controller 36. Background process 152 may be performed concurrently with foreground process 54 (see FIG. 4). Generally, background process 152 performs functions which are not directly initiated by user input received through control panel 44 (see FIG. 3). Instead, such functions may be initiated by the passage of time or the occurrence of temperatures or pressures that are out of range. As indicated by ellipsis in FIG. 8, background process 152 may include any number of tasks which are not relevant to the present invention but which are conventional in microprocessor-based controllers. One such task may be maintaining a timer which controls the above-discussed dead man's switch function.

Process 152 includes a task 154 which maintains a real time clock. Task 154 desirably determines the current month, day, and time. In addition, task 154 desirably causes the current time to be displayed at display 48 (see FIG. 3). After task 154 a task 156 maintains any alarm clock timers which may be actively timing the dispensing duration of a commodity. If task 156 detects an expired timer, then task 156 desirably leaves the timer in its expired state and closes corresponding valves 24 (see FIGS. 1–2). Accordingly, the end of the dispensing duration set above in connection with tasks 138 and 142 (see FIG. 4) is detected in task 156.

After task 156, a task 158 determines and displays a price for any commodity currently being dispensed. Task 158 calculates price based upon the selected quantity, time of day, and selected brand. The time of day is used in connection with memory structure 86 (see FIG. 7) to determine whether to apply the happy hour (H), standard (S), or premium (P) rate. Memory structure 82 (see FIG. 6) may be evaluated to get the price associated with the selected rate, brand, and quantity.

Following task 158, a task 160 reads the beer temperature (s) indicated by temperature sensors 34 (see FIGS. 1–2). In addition, task 160 may display the temperature at display 48 (see FIG. 3) if beer is currently being dispensed. Following task 160, a query task 162 determines whether this temperature is out of range. Task 162 may evaluate memory structure 82 in making its determination. If the temperature is outside the desired range, a task 164 annunciates a warning using buzzer 50 and/or display 48.

Following task 164 and when task 162 determines that beer temperature is within its desired temperature range, a task 166 reads the beer pressures indicated by pressure sensors 26 (see FIGS. 1–2). In addition, task 166 may display the pressure at display 48 (see FIG. 3) if beer is currently being dispensed. Following task 166, a query task 168 determines whether this pressure is out of range. Task 168 may evaluate memory structure 82 in making its determination. If the pressure is outside the desired range, a task 170 annunciates a warning using buzzer 50 and/or display 48.

After task 170 and when task 168 determines that beer pressure is within its desired pressure range, a query task 172 determines whether it is the bar reporting time. As an example, the bar reporting time may be when the bar closes for a day. So long as the bar reporting time is not detected, program flow loops back to an appropriate entry point in process 152.

When the bar reporting time occurs, a task 174 automatically logs out all operators and generates operator reports at printer 52 (see FIG. 2). Following task 174, a task 176 prints other reports which may be desired, such as a daily bar summary report and weekly, monthly or yearly reports when appropriate. After task 176, program flow loops back to an appropriate entry point in process 152.

FIG. 9 shows an exemplary operator report 178 generated by controller 36. Report 178 includes data 180 which identify the operator's PIN. In addition, the time of the report, the time at which the operator logged in, and the time the operator last dispensed a commodity are indicated. A summary section totals the transactions recorded for the operator, itemized according to brand and size. In addition, the number of cleaning cycles authorized by the operator is indicated, and the duration of the last cleaning cycle is indicated. Of course, those skilled in the art will appreciate that reports may be configured to produce a wide variety of data and need not be precisely as indicated in FIG. 9.

In summary, the present invention provides an improved apparatus and method for dispensing valuable bulk commodities. Accountability is provided by recording transactions in association with the identities of the persons responsible for the transactions. Reports which disclose these data are printed for later review. While accountability is provided, flexibility is not compromised. Managers and operators may operate valves as they see fit and collect money as they see fit. The system does nothing to impede this operation so long as it occurs while the bar is defined to be open. Moreover, managers may define the operational parameters, including when the bar is defined to be open. The dispensing of a commodity is automatically controlled so that an operator need only initiate the dispensing of the commodity. The system automatically stops dispensing the commodity when a selected quantity has been dispensed. While the present invention is not limited to dispensing beer, it is particularly suitable for that purpose. When applied to dispensing beer, the accountability provided by the system helps a bar owner ameliorate beer losses.

The present invention has been described above with reference to preferred embodiments. However, those skilled in the art will recognize that changes and modifications may be made in these preferred embodiments without departing from the scope of the present invention. For example, those skilled in the art will appreciate that the precise task sequencing, process organization, and memory structure relationships discussed herein may be substantially altered while achieving equivalent results. These and other changes and modifications which are obvious to those skilled in the art are intended to be included within the scope of the present invention.

What is claimed is:

1. An apparatus for controlling the dispensing of valuable bulk commodities to maintain accountability over said commodities, said apparatus comprising:

a commodity identity selector for routing one of a plurality of commodities to a dispensing port;

a commodity quantity selector for controlling an amount of said one commodity which is routed to said dispensing port;

a dispensing attendant selector for identifying a person responsible for causing said amount of said one commodity to be routed to said dispensing port, said dispensing attendant selector being configured as an ultimate selector assigned prior to initiating said routing of said commodity to said dispensing port; and recording means, coupled to said commodity identity selector, said commodity quantity selector, and said dispensing attendant selector, for recording said selected one commodity, said amount, and said identified responsible person in association with one another.

2. An apparatus as claimed in claim 1 wherein:

said commodities are liquids;

said commodity identity selector, said commodity quantity selector, said dispensing attendant selector, and said recording means are included in a controller; and said apparatus additionally comprises a plurality of valves coupled to and controlled by said controller, said valves being configured to promote and impede flow of said plurality of liquids in response to control signals generated by said controller.

3. An apparatus as claimed in claim 2 wherein:

said commodities are beers and each of said valves resides in a beer circuit having an upstream and downstream section relative to said valve;

said apparatus additionally comprises a pressure sensor located in one of said upstream sections of one of said beer circuits; and said controller includes annunciating means in signal communication with said pressure sensor, said annunciating means being configured to annunciate a warning when said pressure sensor indicates a beer pressure outside a predetermined desired pressure range.

4. An apparatus as claimed in claim 3 wherein said apparatus additionally comprises a temperature sensor located to sense temperature of at least one of said beers; and said annunciating means of said controller is in signal communication with said temperature sensor, said annunciating means being configured to annunciate a warning when said temperature sensor indicates a beer temperature outside a predetermined desired temperature range.

5. An apparatus as claimed in claim 2 wherein said controller is configured to open one of said valves for a dispensing duration to route said amount of said one commodity to said dispensing port, said dispensing duration being responsive to said commodity identity selector.

6. An apparatus as claimed in claim 5 wherein said dispensing duration is additionally responsive to said commodity quantity selector.

7. An apparatus as claimed in claim 2 wherein said controller is configured to open one of said valves for a dispensing duration to route said amount of said one commodity to said dispensing port, said dispensing duration being responsive to said commodity quantity selector.

8. An apparatus as claimed in claim 1 wherein said commodities are beers;

said apparatus additionally comprises a temperature sensor located to sense temperature of at least one of said beers; and said controller includes annunciating means in signal communication with said temperature sensor, said annunciating means being configured to annunciate a warning when said temperature sensor indicates a beer temperature outside a predetermined desired temperature range.

9. An apparatus as claimed in claim 1 wherein:

said commodity identity selector, said commodity quantity selector, said dispensing attendant selector, and said recording means are included in a controller; and said controller is configured to initiate routing of said one commodity to said dispensing port upon identification of said responsible person and to continue said routing of said one commodity until expiration of a duration determined in response to said selected amount.

10. An apparatus as claimed in claim 1 wherein:

said commodity identity selector, said commodity quantity selector, said dispensing attendant selector, and said recording means are included in a controller; and said controller is configured to prevent routing of said commodities to said dispensing port during a predetermined duration.

11. An apparatus as claimed in claim 1 wherein:

said commodity identity selector, said commodity quantity selector, said dispensing attendant selector, and said recording means are included in a controller;

said controller additionally includes a display; and said controller is configured to calculate a price determined in response to said commodity quantity selector and to cause said price to be displayed at said display.

12. An apparatus as claimed in claim 11 wherein said controller is further configured to determine a time of day and to calculate said price in response to said time of day.

13. An apparatus as claimed in claim 1 wherein:

said commodities are beers;

said commodity identity selector, said commodity quantity selector, said dispensing attendant selector, and said recording means are included in a controller;

said controller additionally includes a cleaning selector;

said controller additionally includes a report generator; and said controller is configured to route an indefinite amount of a selected commodity to said dispensing port upon activation of said cleaning selector and to record said responsible person identity in association with cleaning selector activations.

14. An apparatus as claimed in claim 1 additionally comprising a dispensing attendant assigner configured to assign said dispensing attendant selector for use by said responsible person.

15. An apparatus for controlling the dispensing of beers to maintain accountability over said beers, said apparatus comprising:

a controller for routing one of a plurality of said beers to a dispensing port, for controlling an amount of said one beer which is routed to said dispensing port, and for identifying a person responsible for causing said amount of said one beer to be routed to said dispensing port;

a plurality of valves coupled to and controlled by said controller, said valves being configured to promote and impede flow of said plurality of beers in response to control signals generated by said controller, wherein each of said valves resides in a beer circuit having an upstream and downstream section relative to said valve, wherein one of said valves is located in one of said beer circuits, wherein said downstream section of said one beer circuit extends between said one valve and said dispensing port and wherein said downstream section is comprised of tubing having a length of at least 48 inches; and recording means, coupled to said controller for recording said selected one beer, said amount, and said responsible person identity in association with one another.

16. An apparatus for controlling the dispensing of valuable bulk commodities to maintain accountability over said commodities, said apparatus comprising:

a commodity identity selector configured to permit the concurrent selection of a plurality of said commodities, and to route said selected plurality of commodities to a plurality of respective dispensing ports;

a commodity quantity selector configured to adjust amounts of each of said selected commodities routed to each of said respective dispensing ports in response to the number of said commodities selected;

a dispensing attendant selector for identifying a person responsible for causing said amounts of said commodities to be routed to said respective dispensing ports; and recording means, coupled to said commodity identity selector, said commodity quantity selector, and said dispensing attendant selector, for recording said selected plurality of commodities, said amounts, said respective dispensing ports, and said responsible person identified in association with said dispensing.

17. A method for controlling the dispensing of valuable commodities to maintain accountability over said commodities, said method comprising the steps of:

identifying two commodities from among a plurality of commodities;

choosing a quantity from among a plurality of quantities;

selecting a dispensing attendant identity of a person responsible for the dispensing of said two identified commodities;

dispensing, in response to said selecting step, said selected quantity of said two identified commodities through to two respective dispensing ports;

adjusting, in said dispensing step, quantities dispensed of each of said two identified commodities so that the total dispensed amount substantially equals said selected quantity; and recording said two identified commodities, said selected quantity, said two respective dispensing ports, and said identity of said responsible person in association with one another.

18. A method for controlling the dispensing of valuable commodities to maintain accountability over said commodities, said method comprising the steps of:

identifying a commodity from among a plurality of commodities, wherein said identifying step is initiated by a person responsible for the dispensing of said commodity;

choosing a quantity from among a plurality of quantities, wherein said choosing step is initiated by said responsible person;

selecting a dispensing attendant identity of said responsible person, wherein said selecting step is an ultimate step initiated by said responsible person;

automatically dispensing, in response to said selecting step said selected quantity of said identified commodity through to a dispensing port; and automatically recording said identified commodity, said selected quantity, and said identity of said responsible person in association with one another.

19. A method as claimed in claim 18 wherein said commodities are beers and said method additionally comprises the steps of:

sensing pressure of at least one of said beers;

sensing temperature of at least one of said beers; and annunciating a warning if said sensed beer pressure is outside a predetermined desired pressure range or if said sensed beer temperature is outside a predetermined desired temperature range.

20. A method as claimed in claim 18 wherein said dispensing step comprises the step of opening a valve for a dispensing duration determined in response to said identified commodity and to said selected quantity.

21. A method as claimed in claim 18 wherein, prior to said identifying, choosing, and selecting steps, said method additionally comprises the step of assigning a dispensing attendant selector for said dispensing attendant.

22. An apparatus for controlling the dispensing of beers to maintain accountability over said beers, said apparatus comprising:

a controller having:

a beer brand selector configured to permit the concurrent selection of a plurality of said beers, and to route said selected plurality of said beers to a plurality of respective dispensing taps;

a beer quantity selector configured to adjust amounts of each of said selected beers routed to each of said respective dispensing taps in response to the number of said commodities selected;

a dispensing attendant selector for identifying a person responsible for causing said amounts of said beers to be routed to said dispensing taps, said dispensing attendant selector being configured as an ultimate selector assigned prior to initiating said routing of said beers to said dispensing taps;

recording means, coupled to said beer brand selector, said beer quantity selector, and said dispensing attendant selector, for recording said selected plurality of beer brands, said amounts, and said responsible person identified in association with said dispensing of said beers; and annunciating means for annunciating warnings;

a plurality of valves, each of which resides in a beer circuit having an upstream and downstream section relative to said valve, and each of which is coupled to and controlled by said controller, said valves being configured to promote and impede flow of said plurality of beers in response to control signals generated by said controller;

a pressure sensor located in one of said upstream sections of one of said beer circuits and being coupled to said controller; and a temperature sensor located to sense temperature of at least one of said beers and being coupled to said controller; wherein said controller is configured to open one of said valves for a dispensing duration to route said amount of said one beer to said dispensing tap, said dispensing duration being responsive to said selected beer brand and to said selected beer quantity, and to annunciate a warning when said pressure sensor indicates a beer pressure outside a predetermined desired pressure range or when said temperature sensor indicates a beer temperature outside a predetermined desired temperature range.

* * * * *